(12) United States Patent
Goldberg et al.

(10) Patent No.: US 7,245,909 B2
(45) Date of Patent: Jul. 17, 2007

(54) TELEPHONY CONTROL IN THE FLIGHT DECK

(75) Inventors: Mark L. Goldberg, Peoria, AZ (US); Ken L. Snodgrass, Peoria, AZ (US); Joe Reyes, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 386 days.

(21) Appl. No.: 10/251,235

(22) Filed: Sep. 19, 2002

(65) Prior Publication Data

US 2003/0054817 A1 Mar. 20, 2003

Related U.S. Application Data

(60) Provisional application No. 60/324,035, filed on Sep. 20, 2001.

(51) Int. Cl.
*H04Q 7/20* (2006.01)
(52) U.S. Cl. ............... 455/431; 455/98; 455/435.2; 455/575.2; 455/414.1
(58) Field of Classification Search ............ 455/431, 455/569.1, 98, 414.1, 435.2, 550.1, 575.2
See application file for complete search history.

(56) References Cited

U.S. PATENT DOCUMENTS

| | | | | |
|---|---|---|---|---|
| 3,999,015 A * | 12/1976 | Snyder et al. | ............... | 379/171 |
| 4,903,298 A * | 2/1990 | Cline | ............... | 455/431 |
| 5,334,987 A * | 8/1994 | Teach | ............... | 701/214 |
| 5,438,610 A * | 8/1995 | Bhagat et al. | ............... | 455/431 |
| 5,774,796 A | 6/1998 | Sherwood | | |
| 5,808,661 A * | 9/1998 | Infiesto et al. | ............... | 379/90.01 |
| 5,822,417 A * | 10/1998 | Costa et al. | ............... | 379/177 |
| 5,862,207 A * | 1/1999 | Aoshima | ............... | 379/201.05 |
| 5,903,227 A * | 5/1999 | Scheuer | ............... | 455/166.1 |
| 5,999,827 A * | 12/1999 | Sudo et al. | ............... | 455/564 |
| 6,108,539 A | 8/2000 | Ray et al. | | |
| 6,151,354 A | 11/2000 | Abbey | | |
| 6,385,513 B1 * | 5/2002 | Murray et al. | ............... | 701/14 |
| 6,470,224 B1 * | 10/2002 | Drake et al. | ............... | 700/22 |
| 6,622,030 B1 * | 9/2003 | Romesburg et al. | ............... | 455/570 |
| 2002/0082008 A1 * | 6/2002 | Nelson | ............... | 455/431 |
| 2003/0035520 A1 * | 2/2003 | Cannon et al. | ............... | 379/88.19 |
| 2003/0200546 A1 * | 10/2003 | Keen et al. | ............... | 725/76 |

* cited by examiner

*Primary Examiner*—George Eng
*Assistant Examiner*—Huy Phan
(74) *Attorney, Agent, or Firm*—Ingrassia Fisher & Lorenz

(57) ABSTRACT

A communications system having a plurality of radio communication modes with an audio component, the audio component of the radio communication modes being controlled through an audio panel, and a radiotelephony mode with an audio component being controlled by a radiotelephony device, the audio component of the radiotelephony mode having an audio input for supplying audio to the radiotelephony device. The radiotelephony audio component is integrated with the audio panel, by providing an interface between the audio panel and the radiotelephony device, coupling the audio input of the radiotelephony mode to the audio panel, and directing the audio input of the radiotelephony mode to the interface, the interface coupling the audio input of the radiotelephony mode to the radiotelephony device.

7 Claims, 2 Drawing Sheets

TELEPHONY CONTROL IN THE FLIGHT DECK

CROSS REFERENCE TO RELATED APPLICATIONS

This application claims the benefit of U.S. Provisional Patent Application No. 60/324,035, filed Sep. 20, 2001.

TECHNICAL FIELD

The present invention relates to an aircraft communications system, and more particularly to a telephony communications system.

BACKGROUND OF THE INVENTION

Aircraft telephony communications systems are systems that allow an aircraft crewmember to place telephone calls through a ground based telephone system such as a Public Switched Telephone Network (PSTN). Thus a crew member may place telephone calls to ground based telephone customers or mobile telephone customers similarly as a person on the ground may place a call to another terrestrial user.

In present aircraft telephony systems there exists a radio link between the aircraft and the terrestrial PSTN system. One such link may be through a SatCom digital radio system that accesses terrestrial PSTN through communications satellites. Another possible link is through a conventional Flight Phone system as is employed in many commercial aircraft today, that may have either an analog or a digital radio link to the PSTN.

In order for a crewmember to place a telephone call through the PSTN, typically either the crewmember must remove his headset and utilize a separate telephone handset with a separate control apparatus for, for example, dialing a desired number, or he accesses the radio link to the PSTN through a Multifunction Control and Display Unit (MCDU). The MCDU is a common on-board system that performs many aircraft functions including flight plan management, communications, and the like. An MCDU has a display screen, which may be a CRT, LCD, flat panel display, or other suitable display and an associated control panel consisting of keypads and switches to select the various functions performed by the unit. To place a telephone call through a PSTN, a crewmember must select the telephone function on the MCDU and, using a keypad or other selection mechanism, usually on the MCDU, select or dial the desired number. After selecting the function and number, the crewmember must select the proper function (telephone) on an audio panel to initiate the call. Since the MCDU and the audio panel are usually not conterminously located, the crewmember is required to divert his attention unnecessarily from device to device, thus increasing the workload on the crewmember.

Consequently, it would be desirable to provide a system in which all, or virtually all, audio related functions may be controlled through a single control point, such as the audio panel.

BRIEF SUMMARY OF THE INVENTION

In a communications system having a plurality of radio communication modes with an audio component, the audio component of the radio communication modes being controlled through an audio panel, and a radiotelephony mode with an audio component being controlled by a radiotelephony device, the audio component of the radiotelephony mode having an audio input for supplying audio to the radiotelephony device the invention comprises a method for integrating the radiotelephony audio component with the audio panel, by providing an interface between the audio panel and the radiotelephony device, coupling the audio input of the radiotelephony mode to the audio panel, and directing the audio input of the radiotelephony mode to the interface, the interface coupling the audio input of the radiotelephony mode to the radiotelephony device.

BRIEF DESCRIPTION OF THE DRAWINGS

The present invention will hereinafter be described in conjunction with the appended drawing figures, where.

DETAILED DESCRIPTION OF PREFERRED EMBODIMENTS

The following detailed description of preferred embodiments is merely exemplary in nature and is not intended to limit the invention or the application and uses of the invention.

Figure 1:
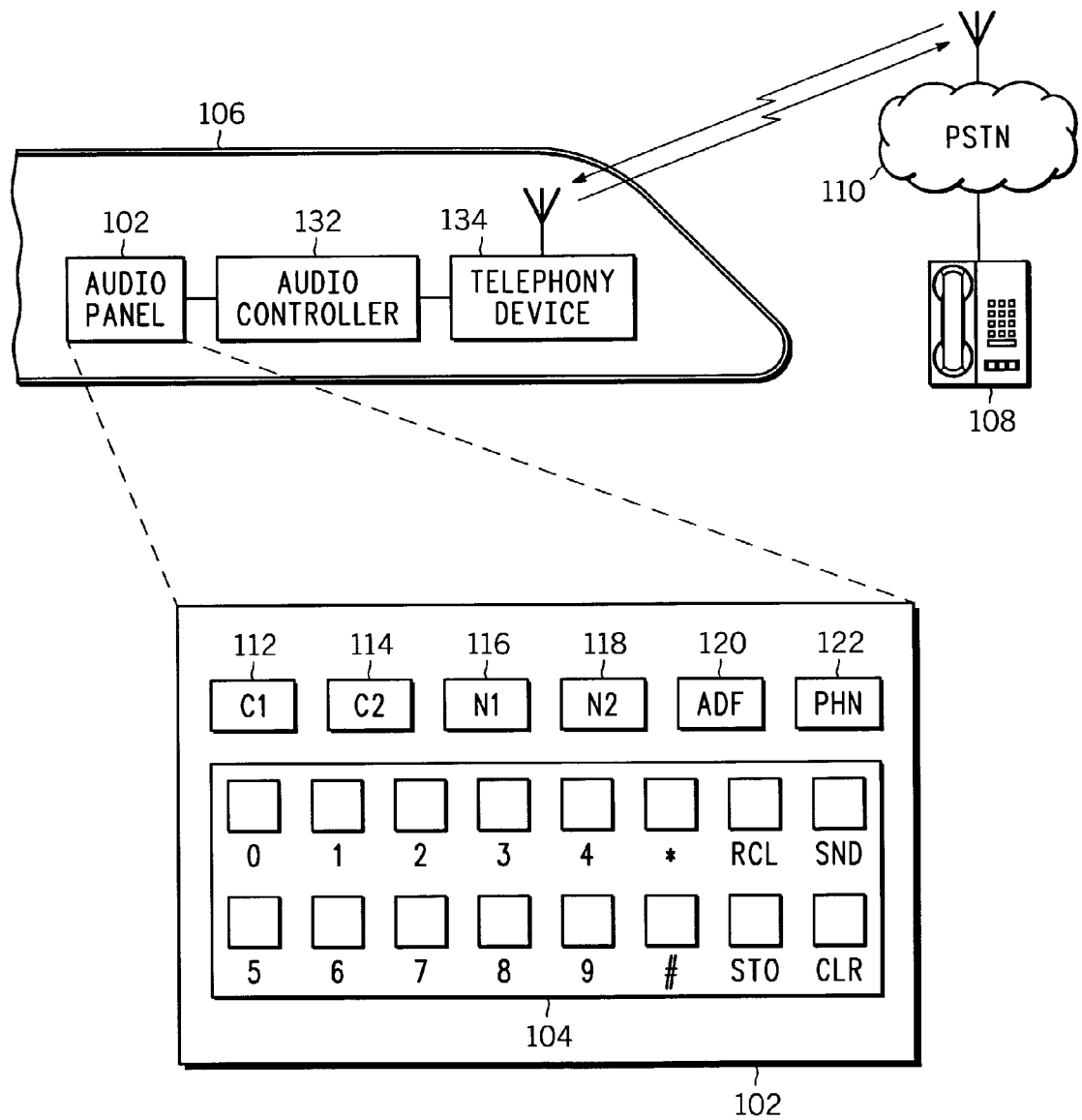
FIG. 1 shows a generalized block diagram of an aircraft telephony system.

FIG. 1 shows a generalized block diagram of an aircraft telephony system 100 in accordance with one embodiment of the invention. The cockpit telephony system comprises an audio panel 102 having a telephony control panel 104 as illustrated in the enlarged view. An aircraft operator (not shown) located within the cockpit 106 of the aircraft can initiate and control a communication session between the cockpit 106 and a communication device 108 connected to a Public Switched Telephone Network 110.

In this embodiment of the invention, the audio panel 102 comprises a plurality of buttons or switches 112, 114, 116, 118, 120, and 122 for selecting the particular radio the audio of which it is desired to hear through the earphones 124 of a headset 126 worn by the pilot or a crewmember of the aircraft. The headset 126 also has a microphone 128 through which the crewmember can provide audio input to the audio panel. Each of the switches 112-122 selects one of the radios on board the aircraft, which may include a first communications radio (not shown) selected by switch 112 for communicating with other communications radios whether airborne, terrestrial, or satellite. Likewise, a second communications radio (not shown) may be selected by switch 114. Switches 116 and 118 may select first and second navigation radios (not shown) and switch 120 may select another navigation radio such as an Automatic Direction Finder (ADF). These navigation radios may be selected so that a crewmember may listen on his headset to the audio identifier of the navigation facility to which the radio is tuned to verify that the navigation radio is, in fact, properly tuned and the navigation facility is operative. Switch 122 may select a telephony communications radio whereby the crewmember may communicate through his headset with a terrestrial Public Switched Telephone Network (PSTN).

As previously noted, typically in order for a crewmember to place a telephone call through a PSTN, either the crewmember must remove his headset and utilize a separate telephone handset with a separate control apparatus for, for example, dialing a desired number, or he accesses the radio link to the PSTN through a Multifunction Control and Display Unit (MCDU). To place a telephone call through a PSTN, a crewmember must select the telephone function on the MCDU and, using a keypad or other selection mechanism, usually on the MCDU, select or dial the desired number. After selecting the function and number, the crewmember must select the proper function (telephone) on an audio panel to initiate the call. Since the MCDU and the audio panel are usually not conterminously located, the crewmember is required to divert his attention unnecessarily from device to device, thus increasing the workload on the crewmember.

By integrating the audio of the telephony system into the audio panel 102, and incorporating a telephone keypad 104 into the audio panel, a crewmember may now use his usual communications headset 126 to provide audio input to the audio panel 102. Since the audio panel 102 also has integrated therewith a telephone keypad having a dialing mechanism and the required function keys, the audio panel may be interfaced to an audio controller 132 which converts the signals from the audio panel to the appropriate signals to drive a telephony device 134 which includes a transceiver for communicating with the PSTN 110.

Figure 2:
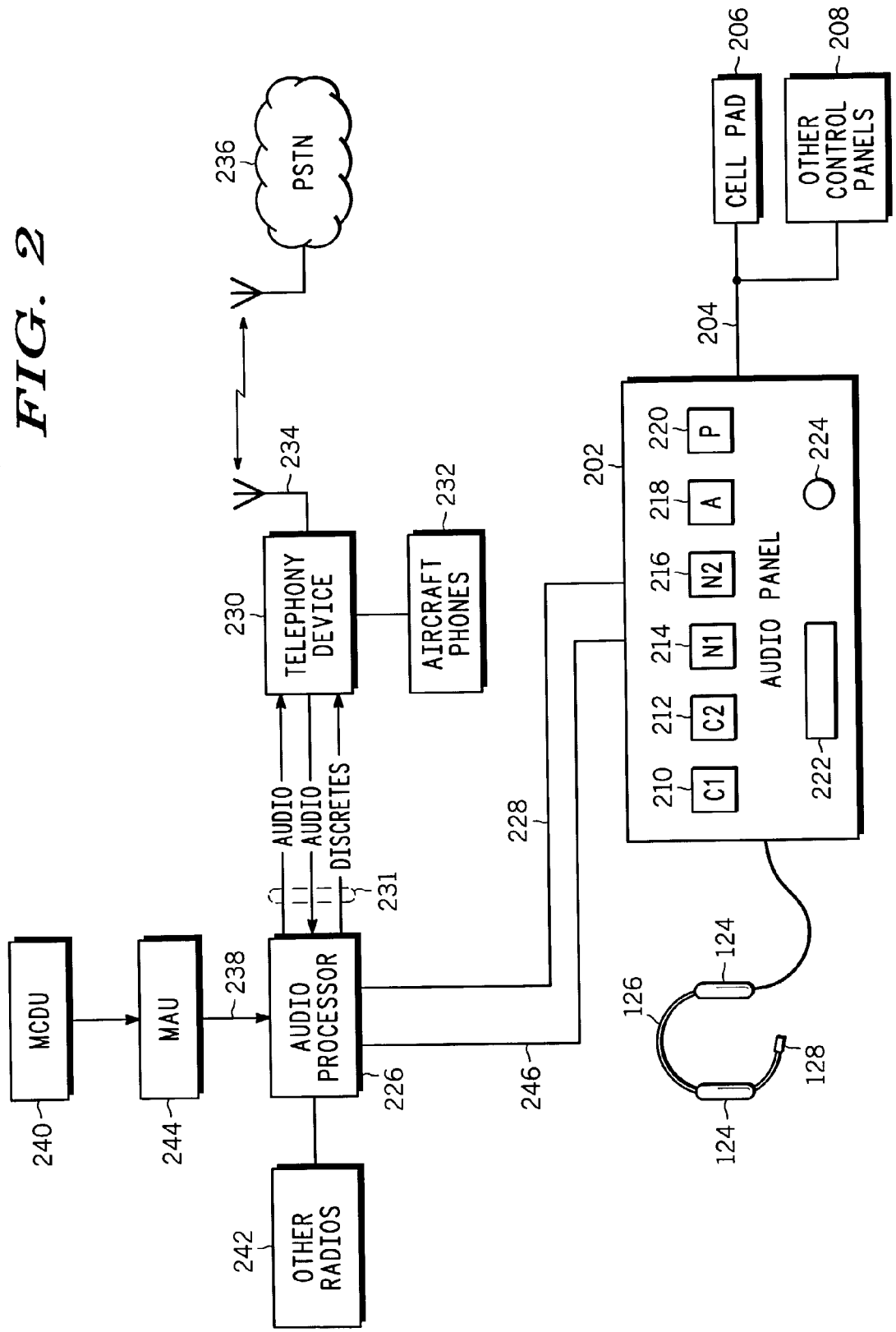
FIG. 2 shows a detailed block diagram of one implementation of the aircraft telephony system of the instant invention.

FIG. 2 shows a block diagram of another embodiment of the invention. In this case, an audio panel 202 is provided and an expansion bus 204 couples the audio panel to a cell pad 206, the function of which is to provide the necessary telephonic control functions such as dialing the phone number and initiating the telephone call. The expansion bus 204 also couples the audio panel 202 to other control panels 208, such that the audio of other radios 242 may be controlled by the audio panel. The audio panel itself has a series of buttons or switches 210, 212, 214, 216, and 218 for selecting one of the radios 242 the audio of which it is desired to hear through the earpieces 124 of a headset 126. The headset 126 also has a microphone 128.

The audio panel 202 additionally has a switch 220 which is used to select the telephony system as will be discussed below. On the audio panel there is also a display 222 and a selection knob or switch 224 the functions of which will be explained below.

An audio processor 226 is coupled to the audio panel 202 by a microphone (mic) bus 228. The mic bus 228 carries audio and control information between the audio panel 202 and the audio processor 226. For example, audio input to the audio panel 202 by the microphone 128 of headset 126 is carried to the audio processor 226 and then either to a selected one of the other radios 242 or to the telephony device 230 in the event that the phone switch 220 is selected.

A telephony device 230 is coupled to the audio processor 226 by a bus 231 which carries audio and discrete signaling such as "off hook", "ring", etc. between the audio processor and the telephony device 230. The telephony device 230 comprises interfaces to phones on the aircraft 232, such as phones used by cabin crewmembers and "flight phones" that may be used by passengers on the aircraft to place telephone calls through a terrestrial PSTN to other telephones on the PSTN network. Telephony device 230 also comprises a radiotelephony transceiver to which the phones 232 are interfaced, and which, through antenna 234 or other radiating means, transmits and receives audio to and from a terrestrial PSTN 236. Depending upon the radio modulation technique employed by the telephony transceiver and the PSTN, of course, the audio transmitted and received by the telephony transceiver may be analog or digital and may be in one of many different forms. The telephony device 230 may be of several types, including SatCom (with which transmissions to and from a terrestrial system are directed through a satellite system) or flight phone systems such as Magna Star.

Also coupled to the audio processor 226 by means of an MAU 244 and an ASCB bus 238 is an MCDU 240, the functions of which have previously been discussed. One of the functions of the MCDU/MAU pair is to store telephone identification numbers and the like to assist in placing calls through the PSTN. The MCDU/MAU is capable of entering and storing a large number of telephone numbers and other data.

In operation, a crewmember, using headset 126, may wish to communicate with an air traffic controller. The crewmember selects the appropriate radio 242 by activating one of the switches 210, 212. The audio panel directs the audio from microphone 128 over the microphone bus 228 to the appropriate radio 242 for transmission to the air traffic controller. The audio from the air traffic controller is likewise passed over an audio bus 246 to the audio panel and then to the earphones 124 of headset 126. If it is desired only to monitor one of the navigation radios to confirm the radio's settings, switch 214, 216, or 218 may be activated to select the desired radio 242. The audio identifier or other information from the navigation facility will be directed over the audio bus 246 to the earphone 124 of the headset 126.

If, however, the crewmember desires to place a telephone call to another telephone on the aircraft 232 or to a terrestrial PSTN, phone switch 220 on the audio panel 202 is selected. The crewmember then selects the identifier of the desired phone by means of selection knob 224 or another selection mechanism such as a cell pad 206 or the like. An electronic rotary switch can access a large number of phone identifiers, such as telephone numbers in a local memory. Alternatively, the numbers or identifiers may be stored only in the MCDU/MAU. Display 222 on the audio panel 202 displays the selected identifier. The identifier may be a series of numbers, such as telephone numbers, or may be textual, such as "Cabin" or "Rear" for phones on-board the aircraft, or "operations" for a terrestrial phone of a particular airline office.

When switch 220 is selected and the telephone identifier is selected, the audio panel directs the control information (phone identifier) and a "send" or other signal over the mic bus 228 to the audio processor. If the actual phone number is stored only in the MCDU/MAU 240, the audio processor 226 may request the identifier from the MCDU/MAU 240. The audio processor 230, through it's interfacing circuitry, converts the telephone identifier, other control information, and audio levels to signals and levels compatible with the particular telephony device in use, and passes those signals and levels over bus 231 to the telephony device 230. If the identifier is associated with one of the phones on the aircraft, the telephony device connects the crewmember's headset to the appropriate phone. If the identifier relates to a telephone or other user connected to the PSTN, the control and audio from the headset 126 and the audio panel 202 is directed to the telephony transceiver that forms a part of the telephony device 230 for transmission to the PSTN 236. Likewise, audio returned from the PSTN over the radio link to the telephony transceiver is directed to the audio processor 226 and converted to levels and signals usable by the audio panel 202 over the audio bus 246. The audio panel 202 then passes the audio information to the headset 126.

Thus has been described an aircraft telephony control system wherein telephony features are combined with other radio communications feature in a single control location in order to reduce crew workload when switching from radio communication to radiotelephony. Of course, while the system has been described in terms of an aircraft implementation, the principles can be applied broadly to other similar communication systems.

While preferred exemplary embodiments have been presented in the foregoing detailed description of preferred exemplary embodiments, it should be appreciated that other variations may exist. It should also be appreciated that these preferred exemplary embodiments are only examples, and are not intended to limit the scope, applicability, or configuration of the invention in any way. Rather, the ensuing detailed description will provide those skilled in the art with a convenient road map for implementing a preferred embodiment of the invention. It being understood that various changes may be made in the function and arrangement of elements described in an exemplary preferred embodiment without departing from the spirit and scope of the invention as set forth in the appended claims.

What is claimed is:

1. A communication system for an aircraft comprising:
    a radiotelephony device comprising a radiotelephony transceiver for providing communication between a telephone in the aircraft coupled to the radiotelephony transceiver and a terrestrial Public Switched Telephone Network (PSTN),
    a radio communications transceiver for providing communication with other communications transceivers not located in the aircraft,
    a headset,
    an audio panel for receiving audio from the radio communications transceiver and providing audio to the headset, the audio panel coupled to the headset; the audio panel further comprising a display for displaying an alphanumerical representation of a target telephone for an outgoing call;
    a telephone selector coupled to the audio panel and configured to allow the target telephone to be selected;
    an audio processor coupled to the audio panel and to the radiotelephony device for providing communication between the headset and the radiotelephony device, whereby a user of the headset may communicate through the headset to the terrestrial PSTN, the target telephone, an airborne telephone located in the aircraft, and with other communication transceivers not located in the aircraft; and wherein communication through the headset to the airborne telephone located in the aircraft occurs without accessing the terrestrial PSTN,
    wherein the telephone selector is configured to be manipulated into at least one position and to select the target telephone based on the at least one position, and
    wherein the radiotelephony device couples the headset to the target telephone if the target telephone is in the aircraft, and transmits the identification of the target telephone to the PSTN through the radiotelephony transceiver if the target telephone is not in the aircraft, the telephone selector selecting between the target telephone in the aircraft and the target telephone not in the aircraft.

2. A communications system as set forth in claim 1 wherein the telephone selector comprises a selection knob.

3. A communications system as set forth in claim 1 further comprising a Multifunction Control and Display Unit (MCDU), the MCDU coupled to the audio processor and operative to store identification information of a plurality of telephones and to provide the identification of the target telephone to the audio processor.

4. The communications system as set forth in claim 1 wherein the telephone selector comprises a keypad mounted on the audio panel.

5. In a communications system having a plurality of radio communication modes with an audio component, the audio component of the radio communication modes being controlled through an audio panel, and a radiotelephony mode with an audio component being controlled by a radiotelephony device, the audio component of the radiotelephony mode having an audio input for supplying audio to the radiotelephony device, a method for integrating the radiotelephony audio component with the audio panel, comprising:
    providing an interface between the audio panel and the radiotelephony device,
    coupling the audio input of the radiotelephony mode to the audio panel,
    directing the audio input of the radiotelephony mode to the interface, the interface coupling the audio input of the radiotelephony mode to the radiotelephony device;
    coupling a headset to the audio panel, the headset providing audio input for the radiotelephony mode and for the plurality of radio communication modes;
    receiving an input at the interface indicative of a target telephone of an outgoing call selected to be coupled to the headset, the input generated by a telephone selector coupled to the audio panel;
    displaying an alphanumeric representation of the target telephone on a display of the audio panel; and
    coupling the telephony device to the target telephone without accessing a terrestrial PSTN if the target telephone is in an aircraft, and transmitting an identification of the target telephone to the terrestrial PSTN through the radiotelephony transceiver if the target telephone is not in the aircraft,
    wherein the telephone selector is configured to be manipulated into at least one position and to select the target telephone based on the at least one position, and
    wherein the radiotelephony device couples the headset to the target telephone if the target telephone is in the aircraft, and transmits the identification of the target telephone to the PSTN through the radiotelephony transceiver if the target telephone is not in the aircraft, the selection knob selecting between the target telephone in the aircraft and the target telephone not in the aircraft.

6. A communications system as set forth in claim 5 wherein the telephone selector comprises a selection knob.

7. A communications system as set forth in claim 5 further comprising a Multifunction Control and Display Unit (MCDU), the method further comprising coupling the MCDU to the interface to provide the identification of a selected telephone to the interface, the identification of the selected telephone stored at the MCDU.

* * * * *